(12) United States Patent
Forman

(10) Patent No.: US 8,112,307 B2
(45) Date of Patent: Feb. 7, 2012

(54) METHOD OF REPORTING THE PRESENTATION OF DATA, A DATA STORAGE MEDIUM AND A SYSTEM FOR EMPLOYING A WEB PAGE

(75) Inventor: George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3476 days.

(21) Appl. No.: 10/365,060

(22) Filed: Feb. 11, 2003

(65) Prior Publication Data

US 2004/0158628 A1   Aug. 12, 2004

(51) Int. Cl.
*G06Q 30/00* (2006.01)
(52) U.S. Cl. ......................................................... 705/14
(58) Field of Classification Search ........................ None
See application file for complete search history.

(56) References Cited

U.S. PATENT DOCUMENTS

| | | | |
|---|---|---|---|
| 5,827,070 A * | 10/1998 | Kershaw et al. | 434/322 |
| 5,893,083 A | 4/1999 | Eshghi et al. | |
| 5,948,061 A | 9/1999 | Merriman et al. | |
| 6,400,996 B1 * | 6/2002 | Hoffberg et al. | 700/83 |
| 6,633,878 B1 * | 10/2003 | Underwood | 707/100 |
| 7,085,682 B1 * | 8/2006 | Heller et al. | 702/186 |
| 7,174,010 B2 * | 2/2007 | McIlwaine et al. | 379/265.01 |
| 2002/0049603 A1 * | 4/2002 | Mehra et al. | 705/1 |
| 2002/0055878 A1 * | 5/2002 | Burton et al. | 705/26 |
| 2003/0039948 A1 * | 2/2003 | Donahue | 434/322 |
| 2003/0152904 A1 * | 8/2003 | Doty, Jr. | 434/350 |
| 2003/0211451 A1 * | 11/2003 | Bergeron et al. | 434/362 |
| 2004/0221063 A1 * | 11/2004 | Mogul | 709/246 |
| 2004/0243685 A1 * | 12/2004 | Sabiers et al. | 709/212 |
| 2006/0117253 A1 * | 6/2006 | Polash | 715/517 |

* cited by examiner

*Primary Examiner* — Colleen Hoar

(57) ABSTRACT

A method of reporting the presentation of data, a data storage medium, and a system for employing a web page is disclosed and that includes accessing a source of data having a specific segment, and reporting a presentation of the specific segment to a remote location.

32 Claims, 4 Drawing Sheets

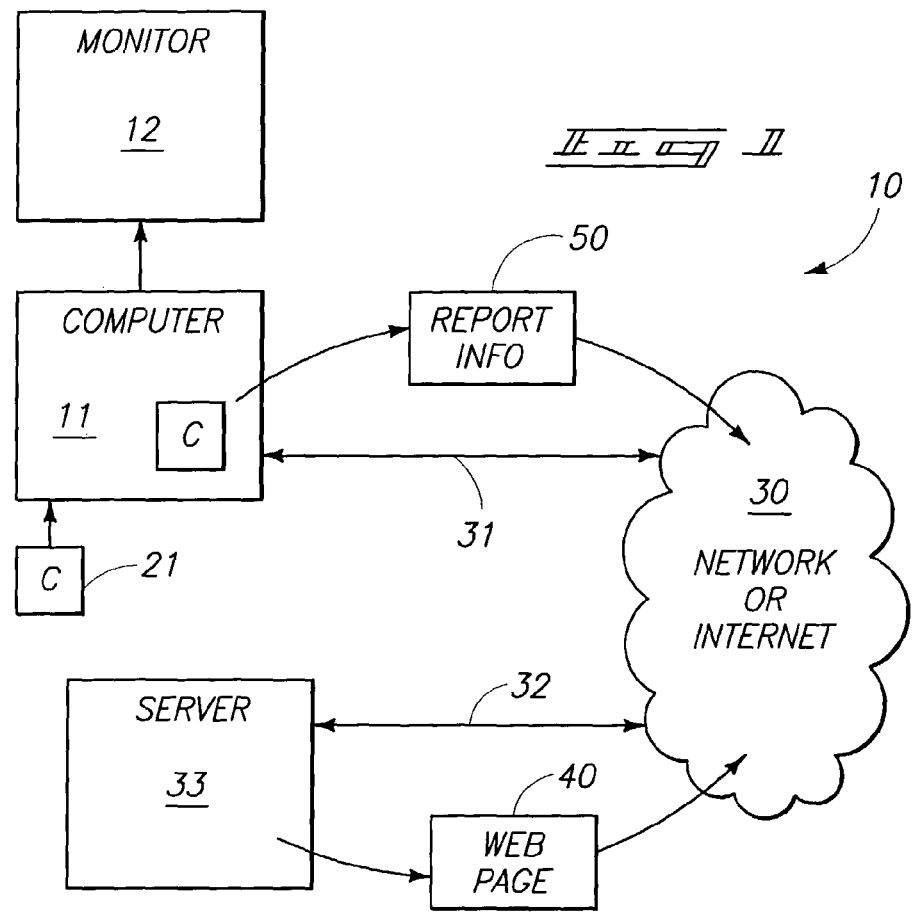
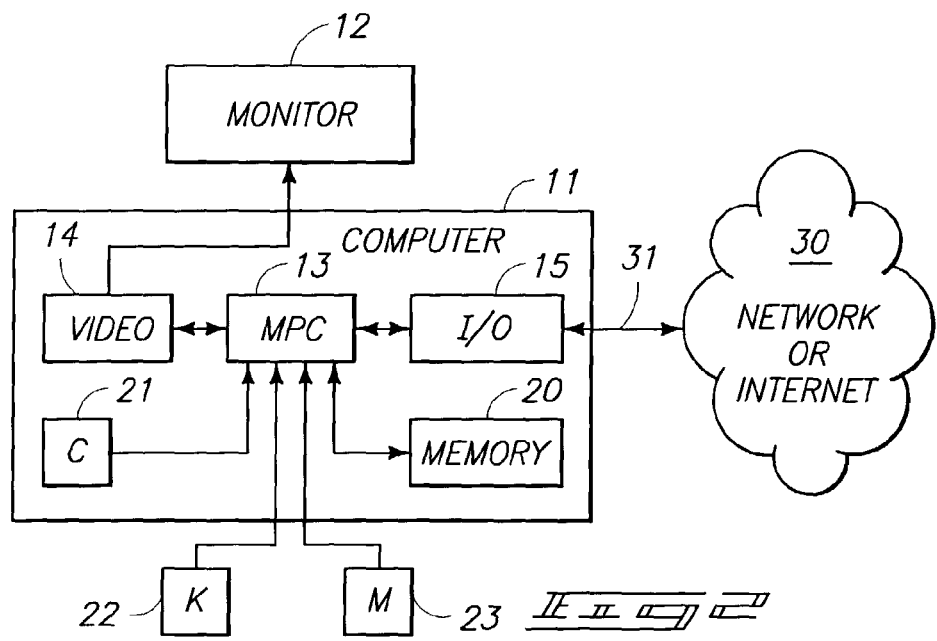

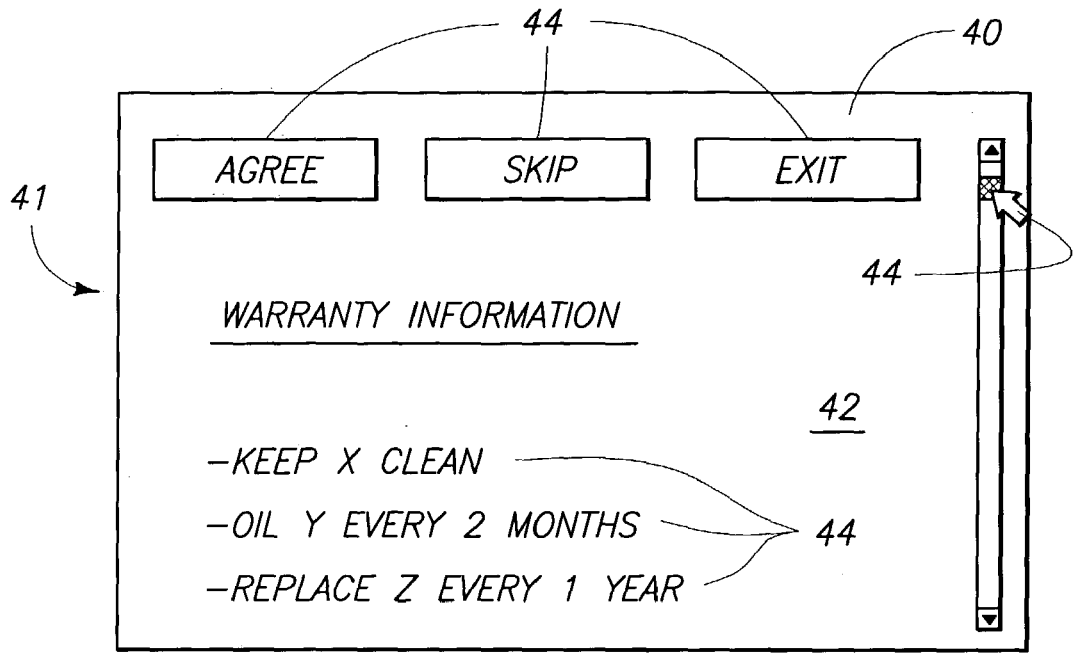
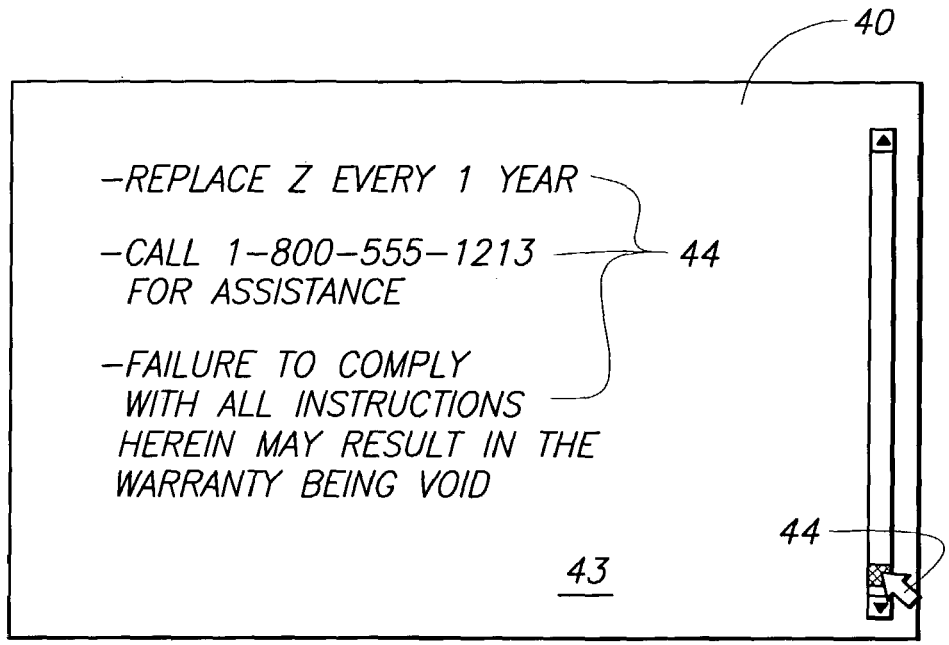

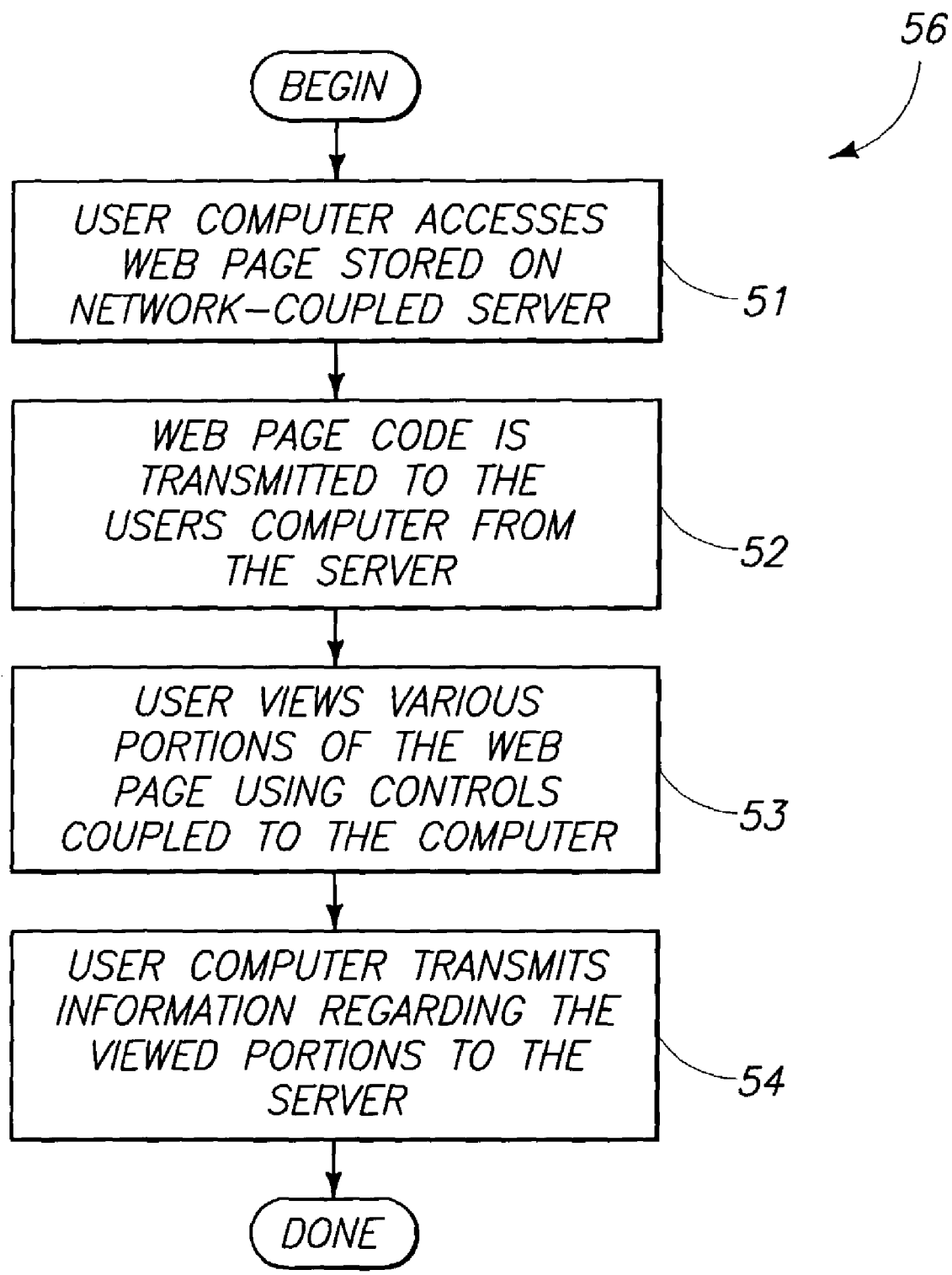

METHOD OF REPORTING THE PRESENTATION OF DATA, A DATA STORAGE MEDIUM AND A SYSTEM FOR EMPLOYING A WEB PAGE

FIELD OF THE INVENTION

The disclosure relates to a method of reporting the presentation of data, a data storage medium and a system for employing a web page, and more specifically to a method and apparatus by which an accurate determination may be made regarding whether a portion of a web page has actually been viewed or displayed to an end user.

BACKGROUND OF THE INVENTION

The delivery of web services promises to be the next wave of Internet based applications. In this regard, there has been a strong emphasis by software vendors and service providers, as of late, to implement web service-oriented architectures that will provide a means by which companies can expose their offerings as web services. In today's economy the Internet is not only being used to provide information and perform simple e-commerce transactions, but is also being used as a platform through which services are delivered to businesses and customers.

Heretofore, the primary focus of web service, software vendor, and other developers has been supporting providers in getting their specific web services up and running, as well as supporting customers in finding and accessing services. Following implementation and support of the web services provided by a company however, attention quickly shifts from creation and delivery of these web services to analyzing web service execution data in an effort to determine the effectiveness of specific advertising that may be incorporated into sometimes rather lengthy web page presentations.

In this regard, web based advertisers have long been interested in knowing whether their particular commercial presentation, information or advertisement has been viewed by a user. Still further, legal departments of web-based businesses are interested in knowing whether a user has actually seen an entire legal agreement provided by way of the web before clicking on an associated button that indicates that they have read and agree to the terms of the legal agreement.

Heretofore, some research and development has been directed to these types of business and management concerns. For example, various web page "hit counters" have been available for the last several years, and that permit a website owner, developer or interested party to count the numbers of users who have actually visited that web page or have accessed portions of the web page, or other cookies associated therewith.

While these previous prior art solutions have operated with some degree of success, they appear unsatisfactory, in part, because current web browser technology has typically prefetched images or portions of the web page that are often off-screen, or cannot be seen, and may never actually be viewed by the individual or end user who is accessing the website.

In view of the foregoing, the prior art approaches and technology provided to date falls far short of providing the salient information that is necessary for advertisers or other interested parties to make informed decisions regarding whether advertisements, commercial presentations or other information has been displayed and are otherwise effective, or further to provide information to other business teams within a company, such as a legal department, who would like to insure that end users have actually seen an entire legal agreement before they have agreed to the provisions of same.

It would therefore be desirable to provide a system and method that addresses one or more of the above issues.

DESCRIPTION OF THE DRAWINGS

Embodiments of the invention are described below with reference to the following accompanying drawings.

FIG. 1 is a greatly simplified block diagram in accordance with embodiments of the invention.

FIG. 2 is a greatly simplified block diagram in accordance with embodiments of the invention.

FIG. 3 is a graphic depiction of a screen display in accordance with embodiments of the invention.

FIG. 4 is a second screen display in accordance with embodiments of the invention.

FIG. 6 is a flow chart showing general steps in accordance with alternative embodiments of the invention.

DETAILED DESCRIPTION

Figure 5:
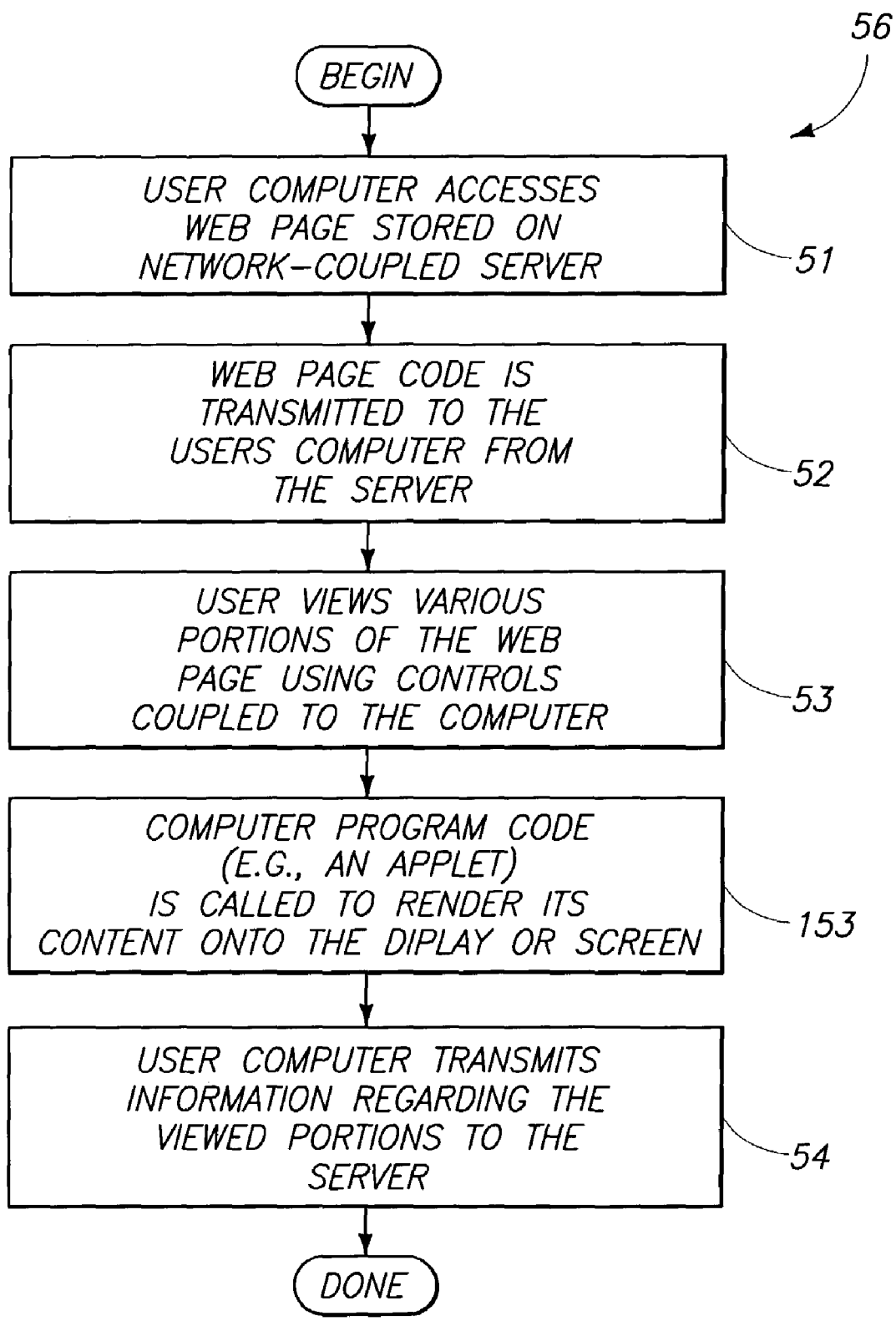
FIG. 5 is a flow chart showing general steps in accordance with embodiments of the invention.

Referring now to FIG. 1 and the following Figures, a method in accordance with various embodiments of the invention is generally indicated by the numeral 10. As seen in FIGS. 1 and 2, a system and method in accordance with various embodiments of the invention includes the use of a computer that is generally represented by the numeral 11. The computer 11 is coupled to an assembly such as a video monitor 12 that may provide a visibly perceptible output. While the assembly 12 is described as being a video monitor, this same assembly 12 may also include other devices that may provide other humanly perceptible outputs, such as an audio output, or any other sensory information by which a human may understand the content of the information supplied by the computer 11 including, in some embodiments, a printer that provides a visible text, or a printed output that can be perceived by the touch of a sight impaired individual.

The computer 11 may include a microprocessor control (MPC) that is generally indicated by the numeral 13, and may be electrically coupled to related output video circuitry 14; and an input/output circuit generally indicated by the numeral 15. As illustrated in FIG. 2, the video circuitry 14 may be electrically coupled to the video monitor 12. Still further, the input/output circuitry 15 may be electrically coupled to a network that will be discussed in greater detail hereinafter. The computer 11 may further include a memory 20 that is coupled to the microprocessor control 13. A control that is generally indicated by the numeral 21, is disposed in data inputting relation relative to the microprocessor control. Yet further, additional data inputting devices such as a keyboard 22 and a mouse 23 may be provided and are electrically coupled with the microprocessor control 13 and may be manually manipulated by a user to provide controlling inputs to the computer 11. As should be understood the control 21 may include other input devices such as voice actuated; light pen, and touch screens that may provide input to the microprocessor control to implement the various features disclosed herein.

As seen by references to FIGS. 1 and 2, the computer 11 is coupled to a network; a global information network; the worldwide web, or "Internet" 30. As seen in the drawings, a first data pathway 31 is operable to couple the computer 11 to the network or Internet 30; and a second data pathway 32 may couple a server 33 to the same network. The server 33 is operable to host a web page (that may have multiple pages, portions, and/or components as will be discussed below) and that can be accessed by the computer 11.

As best understood by reference to FIGS. 1, 3 and 4, a web page 40 that is hosted by the server 33 may include multiple pages only a portion of which may be displayed at any given time on the monitor 12. An example screen display of a portion of one page of a hosted web page 40, in accordance with embodiments of the invention, is shown in FIGS. 3 and 4. As illustrated in these Figures, a graphic user interface 41 may be provided that allows a user (not shown) to humanly perceive a portion 42 of the contents of the web page 40. By way of the controls 21, 22 or 23, the user may provide a data input that causes the web page to respond in a number of different ways. As illustrated in FIGS. 3 and 4, it will be appreciated that the hosted web page 40 has a first displayed portion 42, and a second displayed portion 43. Within each of these displayed portions or screen displays, as shown in FIG. 3, there are areas or other smaller portions of interest or specific segments 44, for which advertisers; web page designers; business owners or other parties may be interested. As earlier discussed, these individuals may be interested in knowing whether specific portions 44 of that web page 40 have been displayed for viewing or have been otherwise rendered perceivable by the operator of the computer 11.

In some embodiments, the web page 40 is provided with a computer readable code (applets) that are individually associated with each of the smaller portions of interest 44. As illustrated in FIG. 1, upon presentation of individual portions of interest 44 on the monitor 11, that is, rendering the portion humanly perceivable, the computer readable code may report 50 the presentation of the portion of interest 44 to a remote location. As shown in FIG. 1, the remote location might be the same server 33 which hosts the web page. This same data information 50 may also be sent to any desired location based upon the computer readable code (applet) that is associated with a particular portion of interest 44. As earlier discussed, the presentation of a portion of interest 44 may be by various means that generate humanly perceptible sensory information. Also as earlier discussed, the presentation of the portion of interest 44 may be performed by way of an input to a control and by various user input devices such as by a mouse, keyboards, light pens, touch screens and voice actuated assemblies of various types.

As will be appreciated by a study of FIG. 3, the computer readable code may be associated with discrete aspects 44; or the individual portions of the web page 42 or 43 being displayed. Still further, the computer readable code may be associated, for example, with individual buttons that may be selectively clicked on by way of an input device. Yet further, the computer readable code may be associated with individual aspects of the web page being displayed such as the printed text associated with the web page, or other images. Moreover, it may also be associated or coupled with a scrolling control as shown. As will be recognized therefore, the embedded or otherwise computer readable code associated with a given portion of interest 44 provides a report 50, by way of a reporting function that allows an individual having interest in a discrete portion 44 of the web page 40 being displayed to be accurately informed regarding the presentation of the portion of interest 44 for whatever business purposes they may have.

As seen in FIG. 5, a flow chart 50 showing the general steps in the present invention is illustrated. As a first matter, and as seen at 51, a user's computer 11 accesses a web page 40 stored on a network coupled server 33. Once accessed, and as seen at 52, the web page code may be transmitted to the user's computer from the server 33. Next, following receipt of the web page code, and as seen at 53, the user views various portions 44 of the web page 40 using the controls 21, 22, and 23 coupled to the computer 11. In step 153, computer program code (e.g., an applet) is called to render its content onto the monitor 12. As seen at 54, the computer program code (e.g., applet) transmits report information 50 regarding the viewed portions to the server. As earlier discussed, this information regarding the viewed portion is sent by way of the computer readable code that is associated with the portions 44 that have been presented or otherwise displayed or have been rendered humanly perceivable.

In alternative embodiments, a browser is provided that has such a reporting facility built in. The code used by the browser (HTML), in these embodiments, is modified to allow this reporting function. In these alternative embodiments, the HTML or code around the portion 44 reports back to the server 33 that the portion 44 was displayed on the monitor 12. The logic flow of FIG. 6, described above, corresponds to these embodiments. The logic flow is substantially similar to the logic flow of FIG. 5, like reference numerals indicating like steps, except that step 153 is omitted.

OPERATION

The operation of the described embodiment of the present invention is believed to be readily apparent and is briefly summarized at this point.

A method for reporting the presentation of data includes providing a user an accessible source of data having a portion of interest 44. In this regard, the accessible source of data having a portion of interest includes a web page 40 that is hosted by a remote server 33. Still further, the method includes associating a computer readable code with the portion of interest 44. The method further includes accessing the source of data by way of a network 30 and presenting the portion of interest 44. Still further, the method includes reporting the presentation of the portion of interest 44 to a remote location using the computer readable code associated with the portion of interest 44. As noted earlier, the web page 40 that is hosted on a remote server 33 may have various portions of interest 44 and the presentation of the portion of interest is performed in response to a user input provided by way of a humanly manipulable control 21, 22 or 23.

The method of the present invention for employing a web page further includes providing a server 33 that is disposed in selective data communication with a network 30; storing a computer-readable code on the server 30, the computer-readable code defining a web page 40 having a humanly perceptible content. Further the method includes providing a reporting function 50 associated with a portion 44 of the computer readable code. As disclosed herein, the reporting function includes a computer code associated with a portion of interest 44. Still further, the method of the present invention includes accessing the computer-readable code stored on the server 33 using a computer 11 coupled to the network 30. The computer includes a display 11 and controls 21, 22 or 23. The method further includes selectively rendering at least a portion 44 of the humanly perceptible content of the web page 40 on the display 12 using the computer-readable code. The portion rendered on the display being in correspondence to a user input to the controls. Still further, the method includes transmitting information regarding the portion rendered on the display 12 by way of the network 30 using the reporting function.

The method or the present invention allows a selective rendering of a plurality of different portions 44 of the humanly perceptible content of the web page 40 in correspondence to a plurality of user inputs provided by way of the controls 21, 22 or 23. Still further, the method allows the transmission of information regarding a select number of the plurality of rendered portions 44 by way of the network 30 and the reporting function 50.

As discussed earlier in this application, the reporting function comprises computer code (e.g., an applet) that are associated with at least a portion 44 of the computer readable code which forms the web page 40.

In various embodiments of the invention, when a web page is viewed, web page code (e.g., HTML) is downloaded from a web server to the 33 to a browser of the computer 11. The web page code indicates to the computer 11 that, for example, a window of a certain size is desired and that it will be used by computer code; e.g., an applet. The browser retrieves the computer code (e.g., applet) from the web server 33. When the code (e.g., applet) runs on the computer 11, the code is given an area (a certain amount of "real estate") on the monitor 12 in which to display. The code could display an advertisement, presentation, or any other information of interest. The code (e.g., applet) reports back to the server 33 that it was displayed on the monitor 12. The logic flow of FIG. 5, described above, corresponds to these embodiments.

In alternative embodiments, a browser is provided that has such a reporting facility built in. The code used by the browser (HTML), in these embodiments, is modified to allow this reporting function. In these alternative embodiments, the HTML or code around the portion 44 reports back to the server 33 that the portion 44 was displayed on the monitor 12. The logic flow of FIG. 6, described above, corresponds to these embodiments.

When information is transmitted back to a remote location, the information may be returned back to the server 33 that hosts the web page 40 or to a different server. Still further, in connection with the reporting function, the transmitting of the information that a portion 44 has been rendered perceivable by a user, may also further include transmitting information regarding the remaining content of the web page 40 that has not been rendered viewable on the monitor or other display device 12, by way of the network and the reporting function.

The arrangement as shown in FIGS. 1 and 2, therefore, discloses a system for employing a web page and that includes means for providing a source of data in selective communication with a network means 30. The source of data defines a web page 40, and that has a computer-readable code associated with portions 44 of the web page. The system for employing a web page further includes a means for accessing the source of data 11 by way of the network means 30. Still further, the system for employing a web page further includes means for viewably rendering 12 at least a portion of the web page 40 in response to the accessing. The viewably rendered portion 42 or 43 of the web page being in correspondence to a user input to a control 21, 22 or 23. Still further, the system for employing a web page further includes means for transmitting information 50 regarding the viewably rendered portion of the web page 40 to a remote location by way of the computer-readable code and by way of the network means 30.

Therefore, the embodiments of the present invention provide a convenient method for reporting the presentation of data on various web page applications in a manner not possible heretofore. Still further, convenient and accurate data is collected in various embodiments, regarding portions of a web page that have been presented to a user to provide all manner of information that can be utilized by business owners for assorted purposes.

While embodiments of the invention have been described above, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of reporting presentation of data comprising:
accessing, by a computer, a source of data having a specific segment;
reporting, by the computer to a remote location, information regarding whether the specific segment was presented to a user, wherein reporting the information is in response to the specific segment being presented to the user; and
providing a computer readable code associated with the specific segment, and wherein the computer readable code is executable in the computer to report the information relating to the presentation of the specific segment to the remote location in response to the specific segment being presented to the user.

2. A method in accordance with claim 1, and wherein the presentation of the specific segment comprises presenting the specific segment on a display that generates perceptible sensory information.

3. A method in accordance with claim 1, and wherein the presentation of the specific segment comprises presenting the specific segment on a printed media.

4. A method in accordance with claim 1, and wherein the presentation of the specific segment is performed in response to an input to a control.

5. A method in accordance with claim 1, and wherein the presentation of the specific segment is performed in response to an input sent by way of user input device.

6. A method in accordance with claim 1, and wherein the presentation of the specific segment is performed in response to an input provided by way of a graphic user interface.

7. A method in accordance with claim 1, and further comprising:
providing a server that stores the source of data that is accessed, and wherein accessing the source of data further comprises utilizing a network that allows a user to gain access to the source of data.

8. A method in accordance with claim 1, and wherein the source of data has a plurality of specific segments each having an associated computer readable code, and wherein at least some of the segments are presented in response to a corresponding input to a control, and wherein information reporting whether the at least some of the segments are presented is reported to the remote location by way of the computer readable code associated with the presented segment.

9. A method in accordance with claim 1, wherein reporting the information is not performed until the specific segment has been presented to the user.

10. A method in accordance with claim 1, wherein the specific segment is one of a plurality of segments displayable to the user, and wherein reporting the information is in response to selective display of the specific segment.

11. A method of reporting presentation of data comprising:
providing a user an accessible source of data having a specific segment;
associating a computer readable code with the specific segment;
accessing the source of data by way of a network;
presenting the specific segment; and
reporting, in response to presenting the specific segment, the presentation of the specific segment to a remote location using the computer readable code associated with the specific segment.

12. A method in accordance with claim 11, and wherein providing the user accessible source of data further comprises providing a server that stores the source of data and that is coupled to a network.

13. A method in accordance with claim 11, and wherein presenting the specific segment is performed in response to a user input provided by way of a control.

14. A method in accordance with claim 11, and wherein presenting the specific segment is made by way of a video monitor.

15. A method in accordance with claim 11, and wherein presenting of the specific segment is made by way of a printed output.

16. A method in accordance with claim 11, and wherein presenting of the specific segment is made by way of an audio output.

17. A method in accordance with claim 11, and wherein presenting of the specific segment is made by way of a humanly perceptible medium.

18. A method in accordance with claim 11, and wherein the source of data has a plurality of specific segments, and wherein presenting the specific segments further comprises presenting at least some of the specific segments in response to a corresponding user input provided by way of a control, and wherein reporting the presentation further comprises reporting, in response to presenting the corresponding specific segment, each presentation using a computer readable code associated with the presented specific segment.

19. A method in accordance with claim 11, and wherein the source of data defines a web page, and wherein the specific segment is the entire web page.

20. A method in accordance with claim 11, and wherein the source of data defines a web page, and wherein the specific segment is a smaller segment of the entire web page, and wherein the computer readable code is an applet provided with the web page, the applet to report the presentation of the specific segment in response to presenting the specific segment.

21. A method in accordance with claim 11, and wherein the source of data defines a web page, and wherein the specific segment is a smaller segment of the entire web page, and wherein presenting the specific segment is performed in response to a user input provided by way of a humanly manipulable control provided with the web page, and wherein the computer readable code is an applet provided with the web page, the applet to report the presentation of the specific segment in response to presenting the specific segment.

22. A method in accordance with claim 11, and wherein the source of data defines a web page, and wherein the specific segment is a smaller segment of the entire web page, and wherein presenting the specific segment is performed in response to a user input provided to a graphic user interface that is associated with the web page, and wherein the computer readable code is an applet provided with the web page, the applet to report the presentation of the specific segment in response to presenting the specific segment.

23. A method in accordance with claim 11, and further comprising:
defining a web page having a plurality of specific segments by way of the source of data, and wherein each segment has an associated computer readable code;
presenting at least some of the specific segments in response to a corresponding user input to a graphic user interface control provided with the web page; and
reporting information indicating that each of the presented segments have been presented, wherein the information is reported to the remote location by way of the associated computer readable code.

24. A method in accordance with claim 11, wherein reporting the presentation comprises reporting, in response to presenting the specific segment, information to the remote location to indicate that the specific segment has been presented.

25. A method in accordance with claim 11, wherein reporting the presentation is not performed until the specific segment has been presented.

26. A method of employing a web page provided by a server in selective data communication with a network, the server storing computer-readable code defining a web page having a humanly perceptible content, the method comprising:
accessing the computer-readable code stored on the server using a computer coupled to the network, the computer including a display and a control;
selectively rendering at least a portion of the humanly perceptible content of the web page on the display using the computer-readable code, the portion rendered on the display being in correspondence to a user input to the control; and
transmitting information regarding the portion rendered on the display by way of the network using a reporting function associated with the computer-readable code, wherein the transmitting is in response to the selective rendering of the portion on the display.

27. A method in accordance with claim 26, and wherein the humanly perceptible content of the web page has a plurality of portions, and wherein the method further comprises:
selectively rendering the plurality of portions of the humanly perceptible content of the web page on the display in correspondence to a plurality of user inputs provided by way of the control; and
transmitting information reporting selective rendering of the plurality of rendered portions by way of the network and the reporting function.

28. A method in accordance with claim 27, and wherein the reporting function comprises discrete computer code applets that are associated with at least a portion of the computer readable code.

29. A method in accordance with claim 26, and wherein the user input to the control comprises providing an input to a graphic user interface.

30. A method in accordance with claim 26, and wherein transmitting the information comprises transmitting the information back to the same or a different server.

31. A method in accordance with claim 26, wherein the information transmitted provides a report that the portion has been rendered on the display.

32. A data storage medium configured to store and provide computer-readable code, the computer-readable code configured to cause a processor to implement a method, comprising:
selectively rendering at least a portion of a viewable web page on a monitor coupled to the processor, the rendered viewable portion being in correspondence to a user input to a control coupled to the processor;
in response to the selective rendering, transmitting information reporting the selective rendering of the portion, wherein the information is transmitted by way of a network coupled to the processor to a remote location; and
providing a computer code applet associated with the rendered viewable portion, and wherein the computer code applet provides the information transmitted to the remote location.

* * * * *